United States Patent
Lu

(10) Patent No.: US 8,135,271 B2
(45) Date of Patent: Mar. 13, 2012

(54) METHOD OF CALIBRATING AN AUTOFOCUS LIGHTING DEVICE OF A CAMERA

(75) Inventor: Tsung-Yi Lu, Tao-Yuan (TW)

(73) Assignee: Ability Enterprise Co., Ltd., Taipei (TW)

( * ) Notice: Subject to any disclaimer, the term of this patent is extended or adjusted under 35 U.S.C. 154(b) by 180 days.

(21) Appl. No.: 12/781,318

(22) Filed: May 17, 2010

(65) Prior Publication Data

US 2011/0280558 A1 Nov. 17, 2011

(51) Int. Cl.
*G03B 13/00* (2006.01)
(52) U.S. Cl. ...................................... 396/106
(58) Field of Classification Search ............ 396/89, 396/106, 121; 348/345
See application file for complete search history.

(56) References Cited

U.S. PATENT DOCUMENTS

| | | | | |
|---|---|---|---|---|
| 6,470,148 | B2 * | 10/2002 | Ide et al. ..................... | 396/80 |
| 6,677,565 | B1 * | 1/2004 | Wahl et al. ................. | 250/201.3 |
| 7,412,159 | B2 * | 8/2008 | Ichimiya ..................... | 396/104 |
| 2003/0063195 | A1 * | 4/2003 | Okisu et al. .............. | 348/208.16 |
| 2004/0252223 | A1 * | 12/2004 | Masuno et al. ............... | 348/345 |
| 2007/0206938 | A1 * | 9/2007 | Tanaka ......................... | 396/106 |
| 2008/0106637 | A1 * | 5/2008 | Nakao et al. ................. | 348/371 |

FOREIGN PATENT DOCUMENTS

EP 1533999 A2 5/2005

OTHER PUBLICATIONS

Partial European Search Report, Application No. EP 10172713, mailed Feb. 10, 2011.

* cited by examiner

*Primary Examiner* — Clayton E Laballe
*Assistant Examiner* — Warren Fenwick
(74) *Attorney, Agent, or Firm* — Stout, Uxa, Buyan & Mullins, LLP

(57) ABSTRACT

A method of calibrating an autofocus (AF) lighting device of a camera is disclosed. A reference image is captured with light projected from the AF lighting device, and a relative position of a central coordinate of the projected light with respect to a central coordinate of the reference image is stored. When operating the camera, the AF lighting device is activated to emit light after a shutter button of the camera is pressed halfway down, and a preview picture is displayed on a panel of the camera. A central position of the emitted light is then transposed toward a center of the panel according to the stored relative position.

20 Claims, 4 Drawing Sheets

METHOD OF CALIBRATING AN AUTOFOCUS LIGHTING DEVICE OF A CAMERA

BACKGROUND OF THE INVENTION

1. Field of the Invention

The present invention generally relates to an autofocus (AF) lighting device, and more particularly to a method of calibrating an AF light-emitting diode (LED) of a camera.

2. Description of Related Art

Some cameras are equipped with an auxiliary autofocus (AF) lighting device such as an AF light-emitting diode (LED) to facilitate focusing action when brightness surrounding the camera is too low. However, due to unpreventable variance existed in manufacturing and assembling, projected light of the AF LED oftentimes cannot coincide with the center of a focus frame. FIG. 1A shows an ideal case in which the projected light 10 of the AF LED ideally coincides with the center of the focus frame 12. FIG. 1B to FIG. 1E show some typical examples in which the projected light 10 of the AF LED deviates from the center of the focus frame 12.

In order to prevent the deviation, the AF LED of each camera need be adjusted manually in the factory such that the center of the emitted light from the AF LED may coincide with the center of a focus frame. Accordingly, this adjusting process costs substantive man hours.

For the foregoing reason, a need has arisen to propose a novel method of calibrating an AF LED of a camera with reduced man hours and associated cost.

SUMMARY OF THE INVENTION

In view of the foregoing, it is an object of the embodiment of the present invention to provide a method of calibrating an autofocus lighting device of a camera that can substantially reduce man hours without sacrificing image quality of a captured image.

According to one embodiment, in the prior phase of calibrating an autofocus (AF) lighting device of a camera, a reference image is captured with light projected from the AF lighting device, and a relative position of a central coordinate of the projected light with respect to a central coordinate of the reference image is stored. In the rear phase of calibrating the AF lighting device (e.g., when operating the camera), the AF lighting device is activated to emit light after a shutter button of the camera is pressed halfway down, and a preview picture is displayed on a panel of the camera. A central position of the emitted light is then transposed toward a center of the panel according to the stored relative position.

DETAILED DESCRIPTION OF THE INVENTION

Figure 1A:
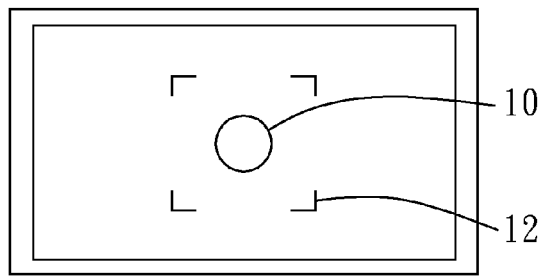
FIG. 1A shows an ideal case in which the projected light of the AF LED ideally coincides with the center of the focus frame.
Figure 1B:
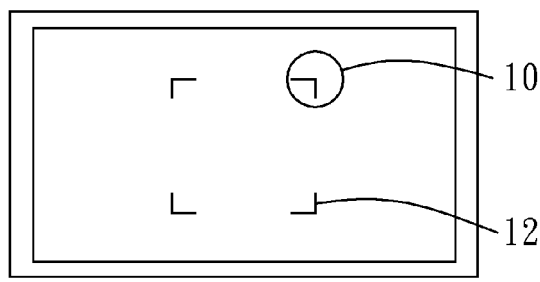
FIG. 1B to FIG. 1E show some typical examples in which the projected light of the AF LED deviates from the center of the focus frame.
Figure 1C:
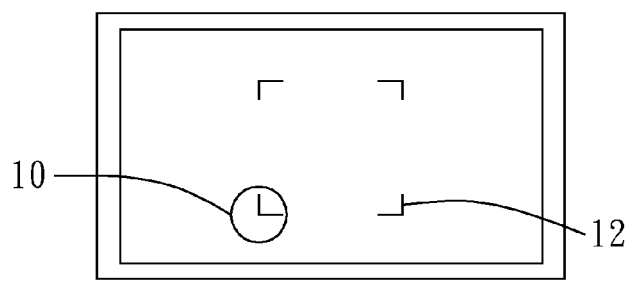
Figure 1D:
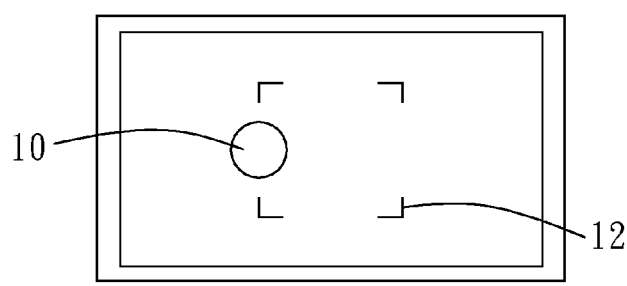
Figure 1E:
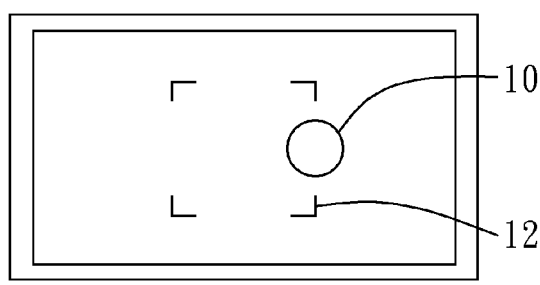
Figure 2:
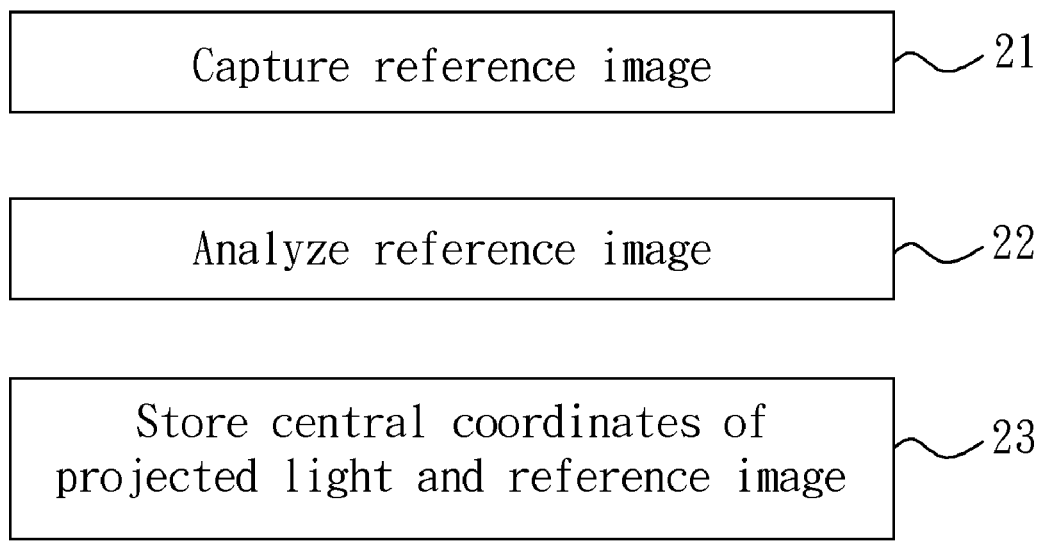
FIG. 2 shows a flow diagram illustrating a method of calibrating an autofocus (AF) lighting device of a camera in the prior phase according to one embodiment of the present invention.

FIG. 2 shows a flow diagram illustrating a method of calibrating an autofocus (AF) lighting device of a camera in the prior phase according to one embodiment of the present invention. In the embodiment, the AF lighting device (or auxiliary AF lighting device) is a light-emitting diode (LED), while other lighting device such as organic light-emitting diode (OLED) may be used as well.

Figure 3:
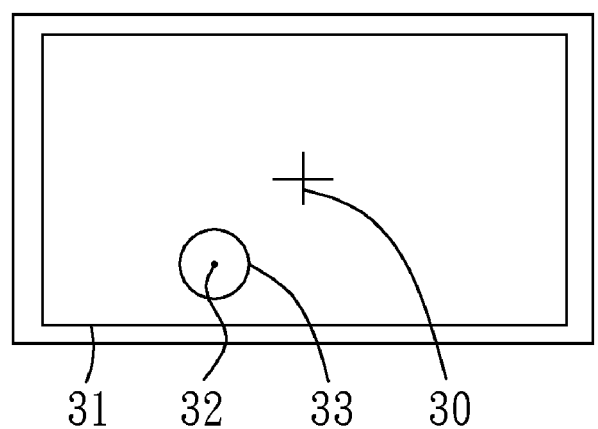
FIG. 3 exemplifies a central coordinate of the reference image and a central coordinate of the projected light.

In step 21, a reference image is captured with light projected from the AF LED, for example, on a reference plane such as a gray card. Subsequently, in step 22, the reference image is analyzed to find a relative position of a central coordinate of the projected light with respect to a central coordinate of the reference image. FIG. 3 exemplifies a central coordinate 30 of the reference image 31 and a central coordinate 32 of the projected light 33. Finally, in step 23, the relative position of the central coordinate of the projected light with respect to the central coordinate of the reference image is stored, for example, in a memory device (e.g., a read only memory (ROM)) of the camera. For example, in one embodiment, both the central coordinate of the reference image and the central coordinate of the projected light are stored. The stored relative position is thereafter utilized during camera operation to calibrate the camera.

Figure 4:
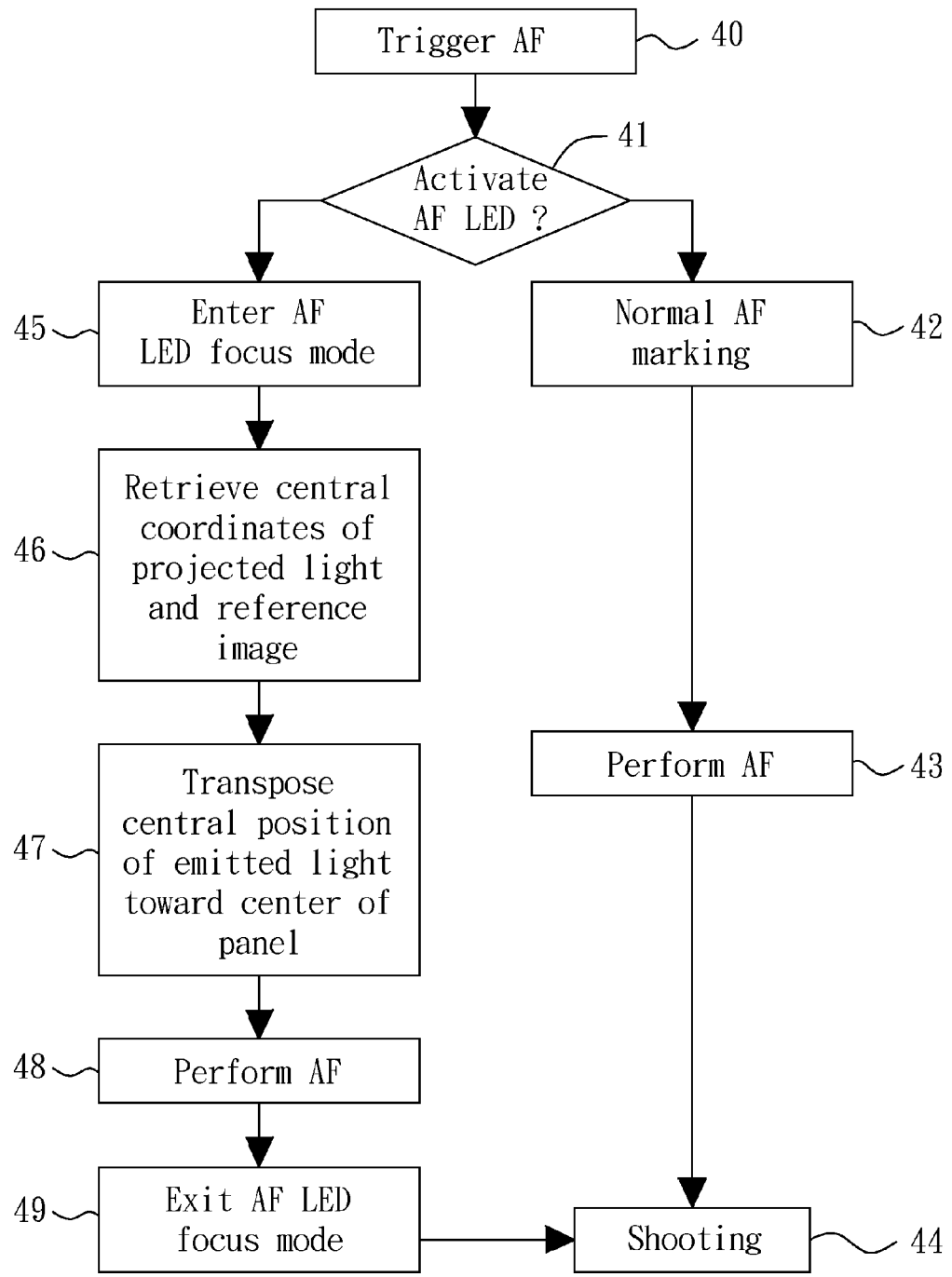
FIG. 4 shows a flow diagram illustrating a method of calibrating an autofocus (AF) lighting device of a camera in the rear phase according to one embodiment of the present invention.

FIG. 4 shows a flow diagram illustrating a method of calibrating an autofocus (AF) lighting device of a camera in the rear phase according to one embodiment of the present invention.

In step 40, AF mode is triggered, for example, when a shutter button of the camera is pressed halfway down during camera operation. In step 41, it is determined whether the AF LED need be activated. In one exemplary embodiment, the AF LED is activated when brightness surrounding the camera is below a predetermined threshold. If it is determined not to activate the AF LED, a normal AF marking (or frame) is marked, for example, on the center of the camera panel (e.g., a liquid crystal display (LCD) panel) (step 42). Subsequently, in step 43, a processor (e.g., a digital signal processor (DSP)) of the camera then performs autofocus (AF) action. Finally, a picture is shot when the shutter button is pressed fully down (step 44).

If it is determined to activate the AF LED in step 41, the camera enters an AF LED focus mode (step 45), the AF LED then emits light, and a preview picture is displayed on the panel of the camera. Next, in step 46, the pre-stored relative position (e.g., the central coordinate of the reference image and the central coordinate of the projected light) is retrieved, for example, from the memory device of the camera.

Figure 5A:
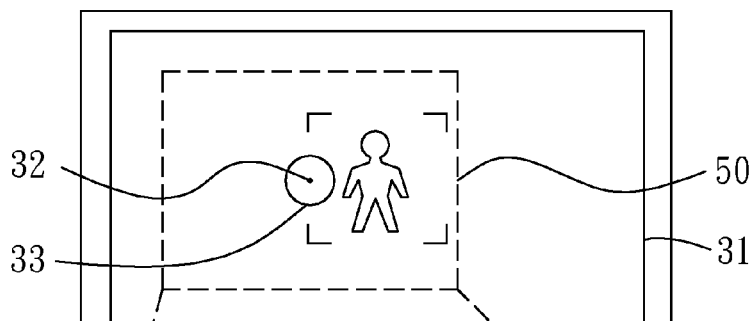
FIG. 5A to FIG. 5D show an exemplary sequence of displays on the panel.
Figure 5B:
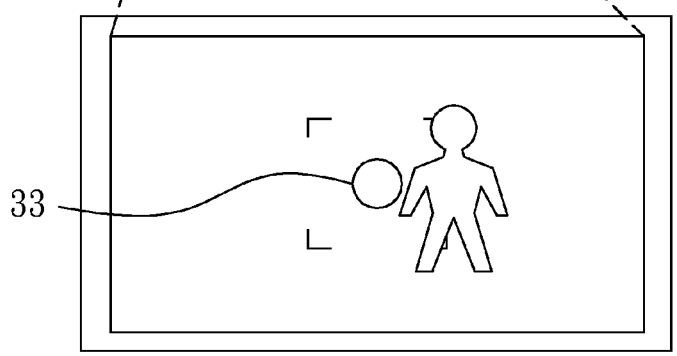
Figure 5C:
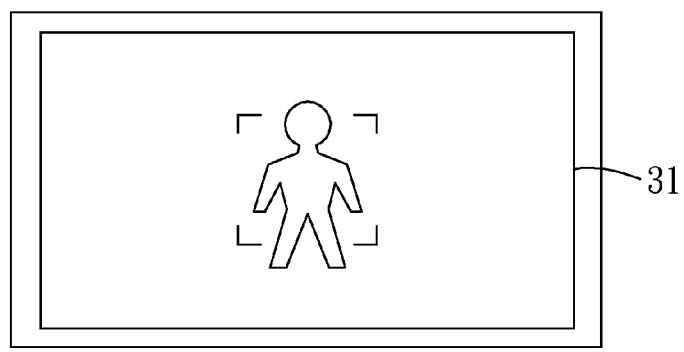
Figure 5D:
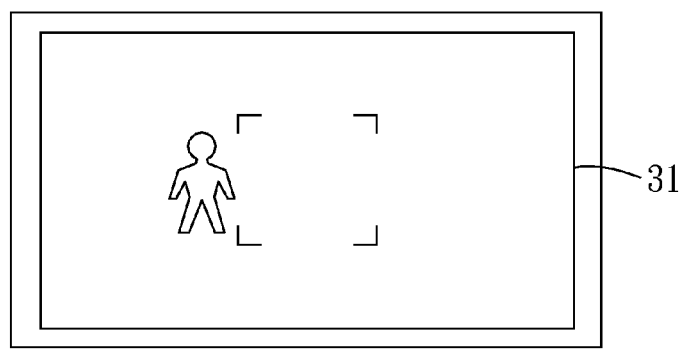

Subsequently, in step 47, the central position of the emitted light is transposed toward a center of the camera panel according to the stored relative position. In the present step, an AF marking is further marked around the center of the panel. Specifically, in one exemplary embodiment, the preview picture is adjusted, for example, by scaling the preview picture to move the central position of the emitted light toward the center of the panel. FIG. 5A to FIG. 5D show an exemplary sequence of displays on the panel. At first, as shown in FIG. 5A, an user aims at an object (e.g., a person in the example) in the center of the panel, while the central position 32 of the emitted light 33 deviates from the center of the panel. Afterwards, within the preview picture, a portion 50 with its center coincided with the central position 32 is scaled and then displayed on the entire panel 31 as shown in FIG. 5B. As a result, the emitted light 33 is now located in the center of the panel, while the object (e.g., the person in the example) is somewhat magnified and moves a little away from the center of the panel. At the present moment, the user may instinctively shift the camera (e.g., to the right in the example) to make the object to be focused to be positioned in the center of the panel 31 (FIG. 5C). As a result, the deviated emitted light is therefore corrected or calibrated. Next, in step 48, a processor (e.g., a digital signal processor (DSP)) of the camera then performs autofocus (AF) action. Finally, in step 49, before a picture is shot (step 44) by pressing the shutter button fully down, the camera exits the AF LED focus mode. Specifically, the AF LED stops emitting light and the scaling action is released. Moreover, a preview picture without scaling such as that shown in FIG. 5D is displayed on the panel 31.

According to the embodiment disclosed above, the AF LED may be calibrated during the camera operation without manually adjusting the AF LED of each camera before it is shipped out of the factory, thereby substantially decreasing man hours and associated cost.

Although specific embodiments have been illustrated and described, it will be appreciated by those skilled in the art that various modifications may be made without departing from the scope of the present invention, which is intended to be limited solely by the appended claims.

What is claimed is:

1. A method of calibrating an autofocus lighting device of a camera, comprising:
    capturing a reference image with light projected from the autofocus lighting device;
    storing a relative position of a central coordinate of the projected light with respect to a central coordinate of the reference image;
    when operating the camera, activating the autofocus lighting device to emit light after a shutter button of the camera is pressed halfway down, and displaying a preview picture on a panel of the camera; and
    transporting a central position of the emitted light toward a center of the panel according to the stored relative position.

2. The method of claim 1, wherein the autofocus lighting device is a light-emitting diode (LED).

3. The method of claim 1, wherein the step of storing the relative position comprises:
    storing the central coordinate of the reference image and the central coordinate of the projected light.

4. The method of claim 3, wherein the central coordinate of the reference image and the central coordinate of the projected light are stored in a memory device of the camera.

5. The method of claim 1, wherein the autofocus lighting device is activated when brightness surrounding the camera is below a predetermined threshold.

6. The method of claim 1, wherein the step of transporting the position of the emitted light comprises:
    adjusting the preview picture by scaling the preview picture to move the central position of the emitted light toward the center of the panel.

7. The method of claim 6, wherein the step of transporting the position of the emitted light further comprises:
    user shifting the camera to make an object to be focused to be positioned in the center of the panel.

8. The method of claim 1, further comprising a step of marking around the center of the panel with an autofocus marking before the shutter button of the camera is pressed fully down.

9. The method of claim 1, further comprising a step of releasing the scaling action and displaying the preview picture before the shutter button is pressed fully down.

10. A method of calibrating an autofocus lighting device of a camera, comprising:
    capturing a reference image with light projected from the autofocus lighting device; and
    storing a relative position of a central coordinate of the projected light with respect to a central coordinate of the reference image;
    wherein the stored relative position is then accordingly utilized during camera operation to transport a central position of light emitted from the autofocus lighting device toward a center of a panel of the camera.

11. The method of claim 10, wherein the autofocus lighting device is a light-emitting diode (LED).

12. The method of claim 10, wherein the step of storing the relative position comprises:
    storing the central coordinate of the reference image and the central coordinate of the projected light.

13. The method of claim 12, wherein the central coordinate of the reference image and the central coordinate of the projected light are stored in a memory device of the camera.

14. A method of calibrating an autofocus lighting device of a camera, in which a relative position of a central coordinate of projected light from the autofocus lighting device with respect to a central coordinate of a reference image is pre-stored, the method comprising:
    when operating the camera, activating the autofocus lighting device to emit light after a shutter button of the camera is pressed halfway down, and displaying a preview picture on a panel of the camera; and
    transporting a central position of the emitted light toward a center of the panel according to the stored relative position.

15. The method of claim 14, wherein the autofocus lighting device is a light-emitting diode (LED).

16. The method of claim 14, wherein the autofocus lighting device is activated when brightness surrounding the camera is below a predetermined threshold.

17. The method of claim 16, wherein the step of transporting the position of the emitted light comprises:
    adjusting the preview picture by scaling the preview picture to move the central position of the emitted light toward the center of the panel.

18. The method of claim 17, wherein the step of transporting the position of the emitted light further comprises:
    user shifting the camera to make an object to be focused to be positioned in the center of the panel.

19. The method of claim 14, further comprising a step of marking around the center of the panel with an autofocus marking before the shutter button of the camera is pressed fully down.

20. The method of claim 14, further comprising a step of releasing the scaling action and displaying the preview picture before the shutter button is pressed fully down.

* * * * *